United States Patent
Hootman

(10) Patent No.: US 8,118,345 B1
(45) Date of Patent: Feb. 21, 2012

(54) FLOORING SYSTEM FOR USE WITH FLATBED TRAILERS

(76) Inventor: Thomas David Hootman, La Porte, TX (US)

(*) Notice: Subject to any disclaimer, the term of this patent is extended or adjusted under 35 U.S.C. 154(b) by 260 days.

(21) Appl. No.: 12/383,697

(22) Filed: Mar. 27, 2009

(51) Int. Cl.
*B62D 33/02* (2006.01)
*B62D 25/20* (2006.01)

(52) U.S. Cl. ............... 296/184.1; 296/204; 52/584.1; 52/591.4; 52/592.1

(58) Field of Classification Search ............... 296/182.1, 296/184.1, 191, 193.07, 204; 105/370, 371, 105/422; 280/789; 52/584.1, 591.4, 591.5, 52/592.1, 459, 471
See application file for complete search history.

(56) References Cited

U.S. PATENT DOCUMENTS

| | | | |
|---|---|---|---|
| 1,807,715 A | | 6/1931 | Tucker |
| 2,117,397 A | * | 5/1938 | Bonsall .......... 52/794.1 |
| 3,294,036 A | | 12/1966 | Van Moss, Jr. |
| 3,319,393 A | | 5/1967 | Tantlinger et al. |
| 3,528,376 A | | 9/1970 | Curtis, Jr. |
| 3,786,611 A | * | 1/1974 | Brown et al. .......... 52/309.2 |
| 4,283,898 A | * | 8/1981 | Claver .......... 52/584.1 |
| 4,332,203 A | | 6/1982 | Flowers |
| 4,526,418 A | | 7/1985 | Martin |
| 4,577,448 A | * | 3/1986 | Howorth .......... 52/584.1 |
| 4,592,585 A | | 6/1986 | Oren et al. |
| 4,656,809 A | * | 4/1987 | Wilson .......... 52/783.14 |
| 4,703,948 A | * | 11/1987 | Ehrlich .......... 280/782 |
| 4,838,605 A | * | 6/1989 | Abromavage .......... 296/184.1 |
| 4,940,380 A | * | 7/1990 | Ballyns et al. .......... 414/495 |
| 5,143,418 A | | 9/1992 | Fouquet |
| 5,274,977 A | * | 1/1994 | Bayly .......... 52/480 |
| 5,417,453 A | * | 5/1995 | VanDenberg .......... 280/785 |
| 5,509,715 A | * | 4/1996 | Scharpf .......... 52/408 |
| 5,928,735 A | * | 7/1999 | Padmanabhan et al. .......... 428/33 |
| 6,131,355 A | * | 10/2000 | Groh et al. .......... 52/592.1 |
| 6,183,824 B1 | * | 2/2001 | Padmanabhan et al. .......... 428/33 |
| 6,270,150 B1 | | 8/2001 | Miller et al. |
| 6,453,632 B1 | * | 9/2002 | Huang .......... 52/403.1 |
| 6,558,765 B2 | * | 5/2003 | Padmanabhan .......... 428/54 |
| 6,558,766 B2 | * | 5/2003 | Padmanabhan et al. .......... 428/54 |
| 6,769,220 B2 | * | 8/2004 | Friesner .......... 52/605 |
| 6,920,721 B2 | * | 7/2005 | Johns et al. .......... 52/79.1 |
| 7,121,059 B2 | * | 10/2006 | Pervan .......... 52/592.2 |
| 7,171,790 B2 | * | 2/2007 | Mei .......... 52/584.1 |
| 7,600,354 B2 | * | 10/2009 | Knauseder .......... 52/592.2 |
| 2006/0179733 A1 | * | 8/2006 | Padmanabhan .......... 52/177 |
| 2007/0200393 A1 | * | 8/2007 | Riley et al. .......... 296/191 |

* cited by examiner

*Primary Examiner* — Glenn Dayoan
*Assistant Examiner* — Gregory Blankenship
(74) *Attorney, Agent, or Firm* — David M. O'Brian

(57) ABSTRACT

The present invention is directed to an improved wooden flooring system for use with flatbed trailers used in the commercial trucking industry. More specifically, the present invention is directed to a plurality of reinforced, domestically grown, wooden floorboards that are affixed together in an end-to-end manner using top and bottom joiner plates and fasteners to create a plurality of integrated floor planks to replace costly and increasingly hard to find tropical hardwood flooring for flatbed trailers.

20 Claims, 4 Drawing Sheets

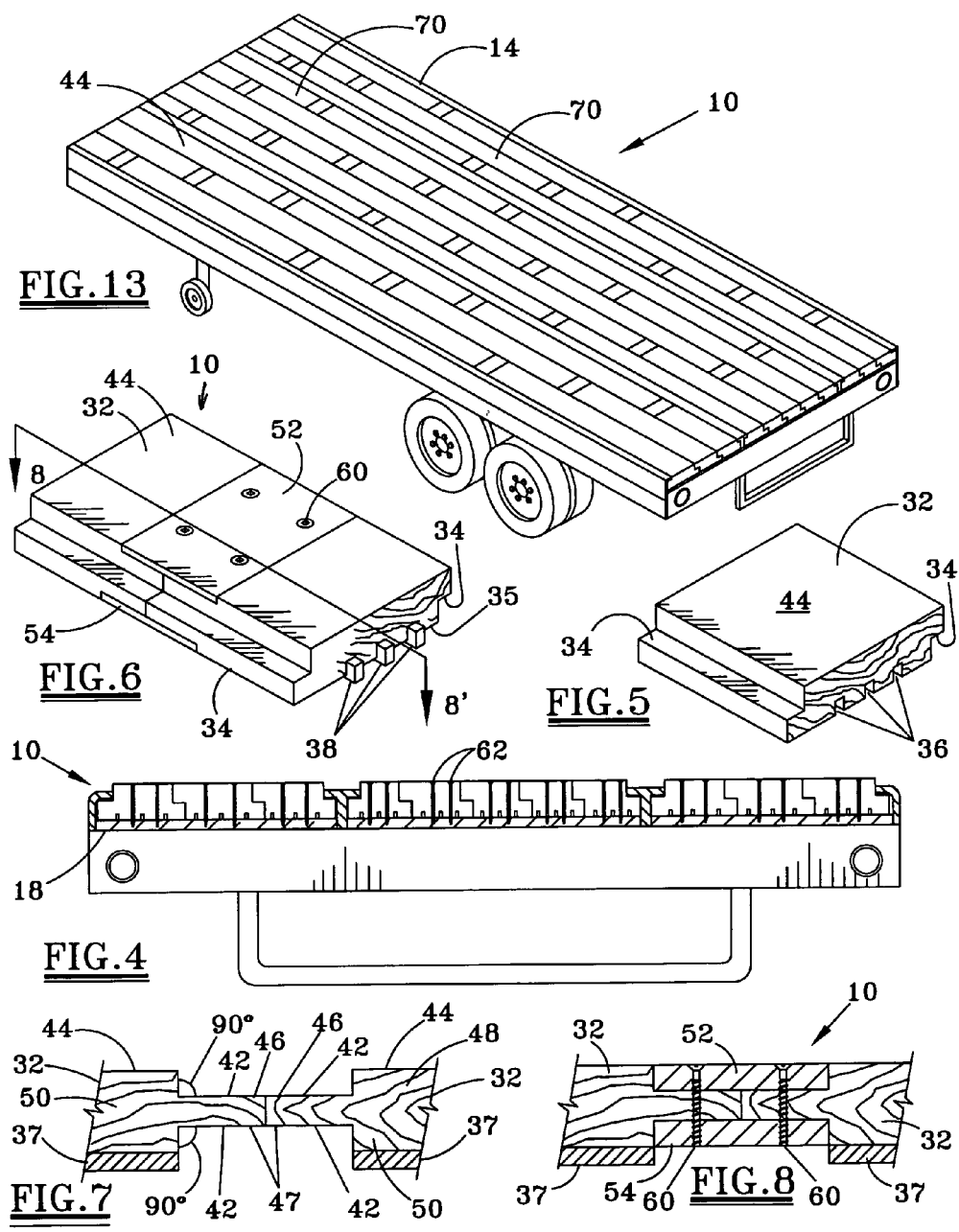

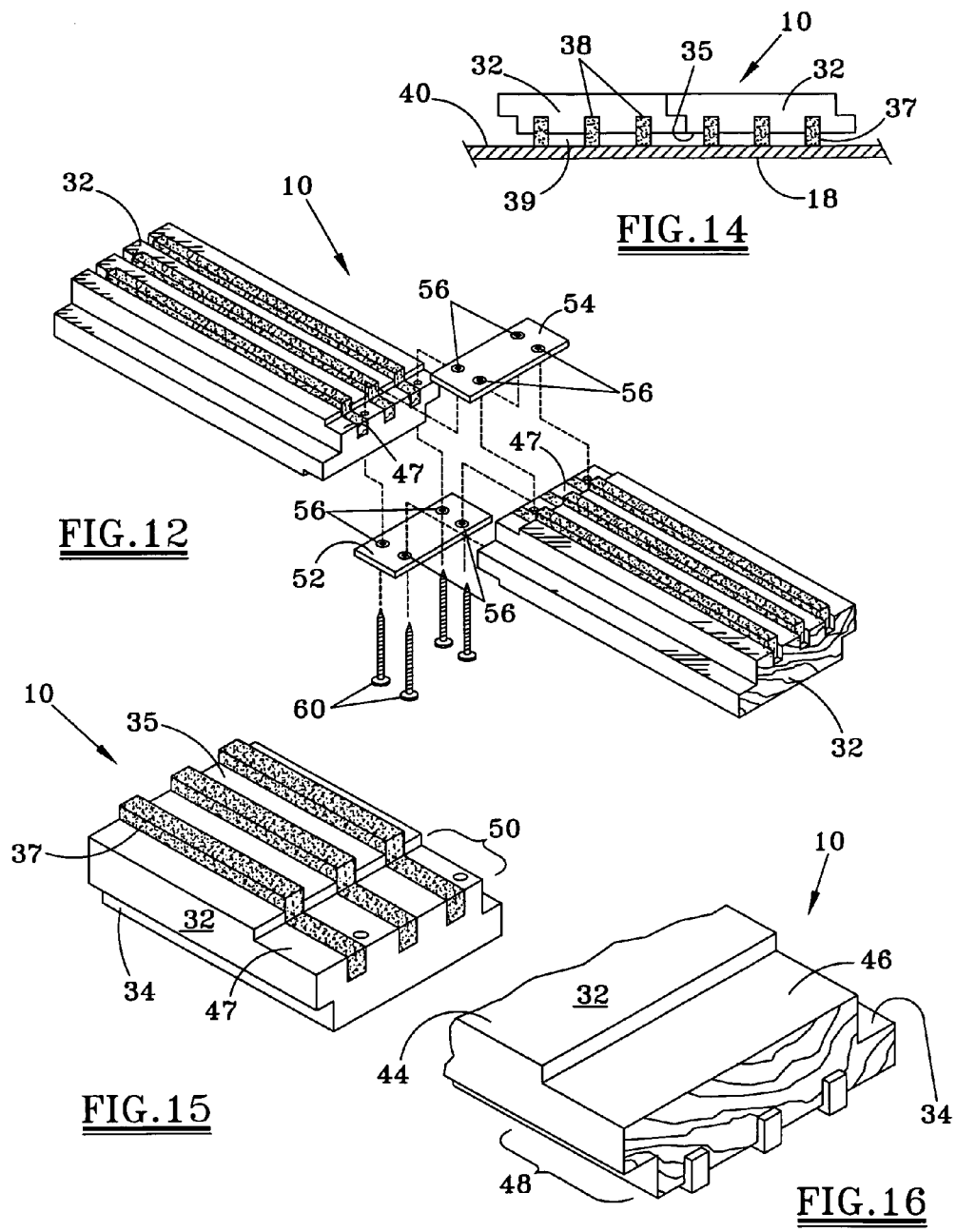

FLOORING SYSTEM FOR USE WITH FLATBED TRAILERS

FIELD OF THE INVENTION

The present invention is directed to an improved wooden flooring system for use with flatbed trailers used in the commercial trucking industry.

BACKGROUND OF THE INVENTION

The use of wooden floorboard material is a preferred flooring material used for flatbed trailer flooring. In particular, the surface texture of wooden floorboards provides a desirable friction surface with which cargo and equipment can adhere to, to generally avoid sliding and shifting during transit. The sliding and shifting of cargo is a common problem when steel or metal material is used for flatbed trailer flooring. Trailer manufacturers and trailer repair shops have, in the past, used imported, tropical hardwood as a standard flooring material for flatbed trailers that are typically attached to "18-wheeler tractors" and other large commercial trucks and tractors used in the commercial trucking industry. The strength, stability and durability of imported, tropical hardwood flooring is generally considered to be superior as compared to that of non-reinforced, domestically grown, wood flooring material, which is plentiful in the US. In particular, tropical hardwood flooring is a preferred flooring material due to it's resistance to damage caused by ultra-violet rays, hot and dry weather, rain, snow, ice and extreme wear and tear. Since flatbed trailer flooring is generally exposed to the outdoor elements, the selection and availability of flatbed trailer flooring material is of great importance.

Over time, however, even the best available tropical hardwood flooring will eventually wear out, but it generally out lasts unmodified, non-reinforced domestically grown wood flooring by a significant amount of time. In the past, the preferred varieties of tropical hardwood, for use with flatbed trailers have been readily found in the rain forests of Brazil and other tropical areas throughout the world. Due to the over harvesting of tropical hardwood trees, the clearing of rain forests worldwide, the general decrease in the number of tropical hardwood trees being replanted, the increased difficulty and expense of locating, harvesting and importing tropical hardwood into the US, an alternative, readily-available, cost-effective flatbed flooring material is needed.

In the past, the use of unmodified, non-reinforced domestic wood flooring such as oak, pine, hickory, etc., has generally not been satisfactory for use in flatbed trailer flooring since the wear expectancy of this type of wood flooring is much shorter as compared to tropical hardwood flooring. In particular, the use of unmodified, non-reinforced domestic wood for flatbed trailer purposes tends to warp, crack, shrink, deteriorate and break loose from the trailer framing, etc., in a relatively short amount of time as compared to tropical hardwood. Considering that the labor cost of installing a wood floor on a flatbed trailer is the same for both tropical hardwood and domestic wood, and that the labor cost is not an insubstantial factor in replacing the trailer flooring, it would be advantageous to use a less expensive, cost-effective, domestically grown, readily available, improved wood flooring material that approaches the quality standards and wear characteristics of tropical hardwood material.

Therefore a need exists to provide a cost-effective, domestically grown, readily available, improved wood flooring system for use with flatbed trailers, eliminating the need for expensive, ever diminishing, tropical hardwood.

SUMMARY OF THE INVENTION

The present invention is directed to an improved wooden flooring system for use with flatbed trailers. More specifically, the present invention is directed to an improved wooden flooring system for use with flatbed trailers wherein the system includes a plurality of domestically grown, metal reinforced, planed, wooden floorboards, wherein the floorboards are connected to each other in an end-to-end manner using joiner plates and threaded fasteners to form a single integrated floor plank. The integrated floor planks can be pre-assembled in desired lengths approximately equal to, or slightly longer than, the length of the trailer frame on which they are to be mounted. With an adequate quantity of pre-assembled, integrated floor planks in inventory, a flatbed trailer can be quickly, efficiently and economically floored, or re-floored as the case may be, using domestically grown, metal-reinforced integrated floor planks, wherein the integrated floor planks generally achieve the quality standards and wear characteristics of a tropical hardwood floor, but are less expensive to use, easier to obtain and do not endanger sensitive rain forests and other tropical areas where tropical hardwood is grown.

BRIEF DESCRIPTION OF THE DRAWINGS

The accompanying drawings which are incorporated into and constitute a part of this specification, illustrate a preferred embodiment of the invention and together with a general description of the invention given above and the detailed description of the preferred embodiment, and any alternative embodiment given below, serve to explain the principals of the invention. Understanding that these drawings depict only typical embodiments of the invention and are not therefore to be considered to be limiting of its scope, the invention will be described and explained with additional specificity and detail through the use of the accompanying drawings, in which:

FIG. 4 is an end view of FIG. 13 wherein the surface of the improved flooring system is slightly taller as compared to height of the main beams of the flatbed trailer.

FIG. 5 is a perspective view of a milled floorboard which illustrates the planar top surface, the grooved bottom surface and the ship-lapped or stair-stepped edges of the milled floorboard.

FIG. 6 is a perspective view of an integrated floor plank illustrating the end-to-end joining of two milled floorboards using a top joiner plate, a bottom joiner plate and a plurality of fasteners.

FIG. 7 is a side view of a first milled floorboard and a second milled floorboard illustrating the upper and lower tenon cuts on the ends of said milled floorboards.

FIG. 8 is a cross-sectional, side view of the integrated floor plank shown in FIG. 6.

FIG. 12 is an exploded view of an integrated floor plank illustrating the end-to-end engagement of a first, reinforced, milled floorboard with a second, reinforced, milled floorboard, in operative association with a top joiner plate, a bottom joiner plate and a plurality of fasteners.

FIG. 13 is a perspective view of the preferred embodiment improved flooring system installed on to a flatbed trailer, wherein a plurality of the integrated floor planks are in side-to-side contact with one another and have been affixed to the skeletal frame of a flatbed trailer as shown in FIG. 1.

FIG. 14 is an enlarged view of the preferred embodiment improved flooring system and its engagement to the junior beam of a flatbed trailer.

FIG. 15 is an end, perspective view of a milled, reinforced floorboard wherein the ribs have been inserted into the milled grooves of the bottom surface and the floorboard has been tenon cut on the bottom surface of the end of the floorboard to illustrate the counter-sunk step on the bottom surface of the milled floorboard.

FIG. 16 is an end, perspective view of a milled, reinforced floorboard wherein the floorboard has been tenon cut on the top surface of the end of the floorboard to illustrate the counter-sunk step on the top surface of the milled floorboards.

DETAILED DESCRIPTION OF THE INVENTION

Figure 1:
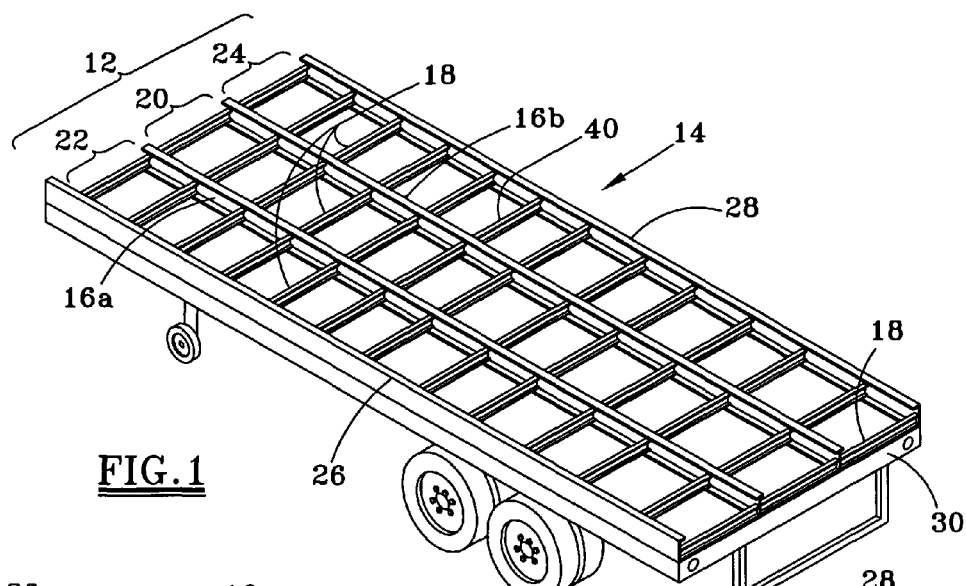
FIG. 1 is a perspective view of a skeletal frame of a flatbed trailer.

The preferred embodiment improved flooring system 10 for use with flatbed trailers 14 is depicted in FIGS. 3-4, 6, 8-9, and 11-16. FIG. 1 illustrates an exposed, un-floored frame 12 of a flatbed trailer 14. Most flatbed trailer frames 12 include an axial pair of main beams 16a, 16b and a plurality of radial aligned junior beams 18. Typically, the main beams 16a, 16b and the junior beams 18 are constructed of metallic or steel material. Conventional trailer flooring material (not shown) is normally affixed to the junior beams 18 using conventional threaded fasteners (not shown). Although the junior beams 18 are separate and independent members, for purposes of description herein, they can be described in terms of creating three separate linear columns 20, 22, 24, upon which the improved flooring system 10 is affixed.

Figure 2:
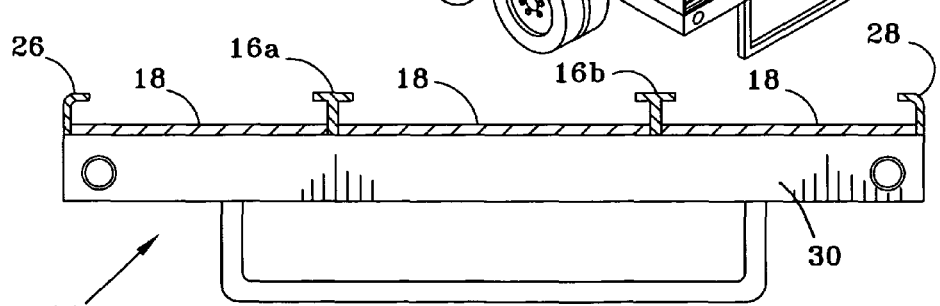
FIG. 2 is an end view of the skeletal frame of the flatbed trailer in FIG. 1.
Figure 3:
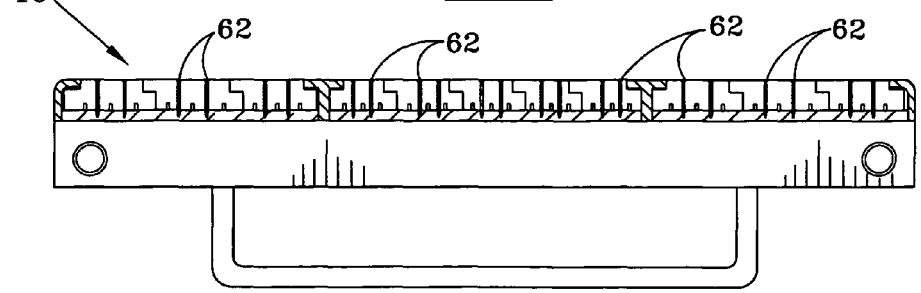
FIG. 3 is an end view of FIG. 13 wherein the surface of the improved flooring system is flush mounted with respect to the height of the main beams of the flatbed trailer.

With reference to FIGS. 1 and 2, the linear columns 20, 22 and 24 of junior beams 18, are further identified as comprising a center column 20, a first side column 22 and a second side column 24. The first side column 22 of junior beams 18 is preferably affixed between and engaged to a first side rail 26 of the trailer 14 and the first main beam 16a. The second side column 24 of junior beams 18 is preferably affixed between a second side rail 28 of the trailer 14 and the second main beam 16b. The center column 20 of junior beams 18 is affixed between, and engaged to, the two main beams 16a, 16b. FIG. 2 depicts an enlarged, end view of the un-floored trailer frame 12 illustrated in FIG. 1 and further shows the engagement of the junior beams 18 with a bumper 30, the first side rail 26, the second side rail 28, and main beams 16a, 16b of the trailer 14.

Figure 10:
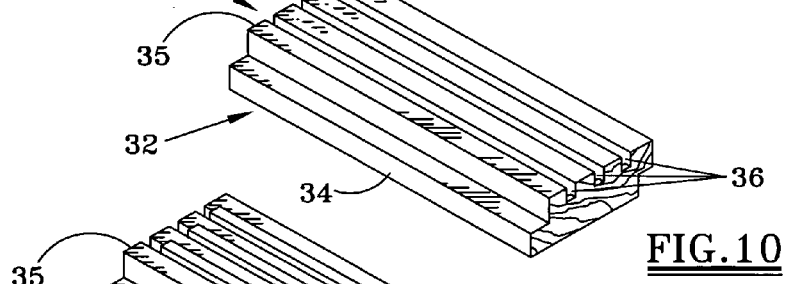
FIG. 10 illustrates the grooved, bottom surface of the milled floorboard and further illustrates the ribs which are to be inserted into the grooves.

FIGS. 5 and 10 illustrate a milled, floorboard 32. The milled floorboard 32 is created from a raw or un-milled, stock wooden board (not shown), for example a 2"×8"×10' or similarly sized wooden board milled from a pine, oak, hickory, etc., tree grown in the U.S. The length of the stock wooden board should be equal to, or slightly longer than, the desired length of the milled floorboard 32, for example, generally in the range of 8 feet to 12 feet. Additionally, the thickness and width of the stock wooden board (not shown) should be equal to or slightly thicker and/or wider than the desired width and/or thickness of the finished, milled floorboard 32.

The milling steps used to create the milled floorboard 32 includes a first step of planing the stock wooden board to obtain a board having a desired width. A desired width might, for example, be in range of 6-8 inches. A second step would include planing the stock wooden board to obtain a board having a desired thickness. A desired thickness might, for example, be in the range of 1-2 inches. A third step would include planeing the stock wooden board to obtain a stair-step or ship-lapped lateral edge 34 on both lateral edges on the milled floorboard 32. The size or dimensions of the ship-lapped edges 34 is not critical, so long as the ship-lapped edges 34 remain uniform and consistent. A fourth milling step would include the step of cutting a plurality of continuous, axial grooves 36 in a bottom surface 35 of the milled floorboard 32. The depth of each axial groove might, for example, be in the range of 0.25-0.75 inch. The preferred embodiment milled floorboard 32 includes at least 2 continuous axial grooves 36, and preferably includes 3 continuous axial grooves 36. After the milled floorboard 32 has been appropriately milled to obtain the desired thickness, width, length, the ship-lapped edges 34 and the plurality of continuous axial grooves 36, a rib 38 is then inserted into each of the axial grooves 36 to reinforce and strengthen the milled floorboards 32. The ribs 38 may be constructed from metallic material and are preferably constructed from a continuous length of metallic material commonly known as metal "bar stock." The ribs 38 are received within the grooves 36, such that an outer edge portion 37 of each rib 38 uniformly protrudes just slightly outwardly from the bottom surface 35 of the milled floorboard 32.

As depicted in FIG. 14, the outer edge portion 37 of the ribs 38 also provides for a very small air space or gap 39 between a top surface 40 of the junior beams 18 and the bottom surface 35 of the milled floorboard 32. This gap 39 allows for surface-to-surface contact between the rib 38 and the junior beams 18, rather than a wood-to-metal contact, thereby adding more stability to the improved flooring system 10 and reducing the opportunity for moisture to accumulate between the top surface 40 of the junior beams 18 and the bottom surface 35 of the milled floorboard 32.

As illustrated in FIGS. 7, 15-16, after the ribs 38 have been inserted into the grooves 36, the milled floorboards 32 are then milled or processed again to create a tenon cut 42 in a top planar surface 44 of the milled floorboard 32 and also in the bottom surface 35 of the milled floorboard 32. The tenon cuts 42 can be obtained using well-known milling machinery. The tenon cuts 42, produce a 90-degree counter-sunk "step" 46 into a top end 48 and a 90-degree counter-sunk "step" 47 into a bottom end 50 of both linear ends of the milled floorboards 32.

As shown in FIGS. 6, 8 and 12, a top joiner plate 52 and a bottom joiner plate 54 are then inserted into the counter-sunk steps 46, 47 of the end-to-end adjoining milled floorboards 32. The top joiner plate 52 is designed to fit flush within the top surface 44 counter-sunk steps 46 of the tenon cut 42 end portions of two adjoining milled floorboards 32 to provide for a generally smooth flooring surface, upon which to place cargo (not shown). The bottom joiner plate 54 is designed to engage the bottom surface 35 of the counter-sunk steps 47 of the tenon cut 42 end portions of the two adjoining milled floorboards 32, such that the joiner plates 52, 54 are in axial alignment with each other. The joiner plates 52, 54 are roughly equal to each other in size and shape, where, for example, each plate 52, 54 may be approximately 3 inches long, 6-7 inches wide and the thickness is in the range of between ⅛ inch-¼ inch. Thus the joiner plates 52, 54 make up a very small surface portion of the top surface 44 of the milled floorboard 32. The joiner plates 52, 54 could, for example, be constructed of various types of metal, steel, or polymer material. The joiner plates 52, 54 also include a plurality of pre-drilled, pilot holes 56. As further detailed in FIG. 12, the pilot holes 56 on the top joiner plate 52 are positioned in such manner that they are in vertical alignment with the pilot holes 56 of the bottom joiner plate 54. The tenon cuts 42 are made in such a way that when the joiner plates 52, 54 are installed in the steps 46, 47, the edges of the joiner plates 52, 54 remain in linear alignment with the ship-lapped edges 34, as more specifically seen in FIG. 6.

Once the top joiner plate 52 and the bottom plate 54 are inserted into their respective counter-sunk steps 46, 47, as depicted in FIGS. 7-8 and 12, a threaded fastener 60 is then inserted into each of the pilot holes 56 of the top joiner plate 52. Thereafter, each threaded fastener 60 is then operatively threaded through and penetrates the top joiner plate 52, the tenon cut 42 end portions of the two adjoining milled floorboards 32 and finally through the pilot holes 56 of the bottom joiner plate 54 to securely attach the linear ends of the two adjoining milled floorboards 32 to form an integrated floor plank 70. The threaded fasteners 60 could for example be self-tapping, counter-sunk torx tip head screws, having a beveled counter-sunk head to maintain a generally smooth top surface 44 of the milled floorboard 32.

Figure 9:
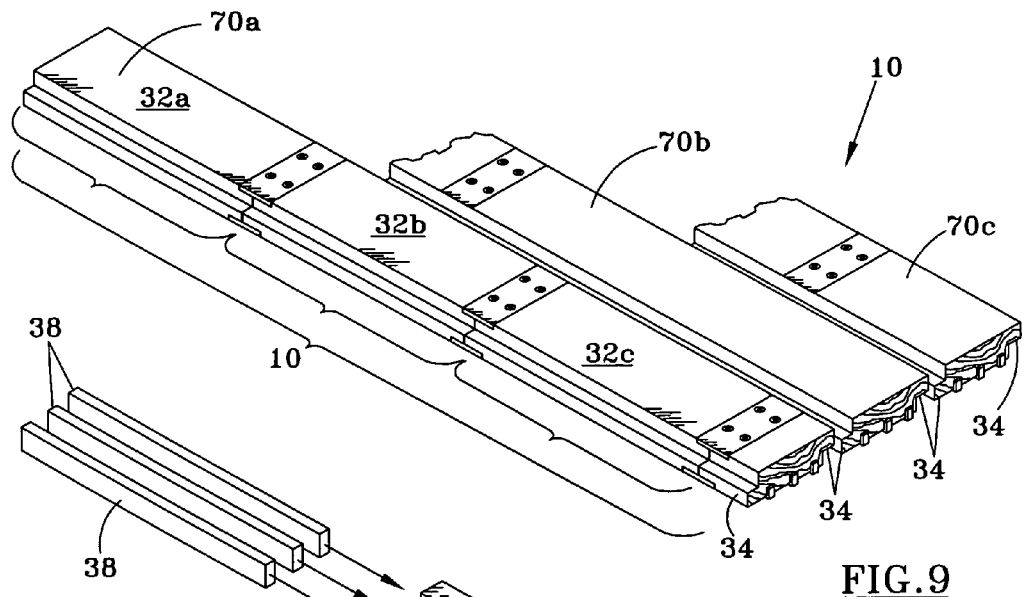
FIG. 9 illustrates a plurality of integrated floor planks, wherein the integrated floor planks are positioned in a side-by-side manner, but are not illustrated in contact with one another.
Figure 11:
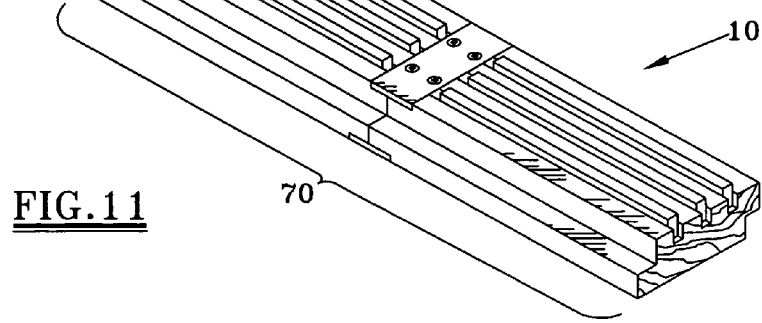
FIG. 11 is a perspective view of the bottom surface of an integrated floor plank illustrating the end-to-end joining of two milled floorboards using a top joiner plate, a bottom joiner plate and a plurality of fasteners.

As depicted in FIGS. 9 and 11, the preferred embodiment flooring system 10 is constructed from a plurality of reinforced, milled floorboards 32a, 32b, 32c, etc., which are affixed to one another in an end-to-end manner to construct the integrated floor plank 70. The integrated floor plank 70 is preferably constructed to an axial length that is equal to or slightly longer than the length of the trailer frame 12, upon which it will be installed. The user of the preferred embodiment flooring system 10, i.e., a flatbed trailer repair shop, a flatbed trailer manufacturer or trailer flooring manufacturer, could, for example, mass produce or purchase and store, a significant quantity of pre-assembled, integrated floor planks 70, in standard or desired lengths, i.e., 40 feet, 42 feet, 45 feet, 48 feet, 54 feet, etc., and be ready when a flatbed trailer 12 is brought in for flooring, or re-flooring as the case may be, to quickly and efficiently install the preferred embodiment flooring system 10. By having the ship-lapped lateral edges 34, the pre-assembled integrated floor planks 70a, 70b, 70c, etc., can easily be laid next to one another on the junior beams 18 where the ship-lapped edges 34 contact and engage to one another as they are attached to the junior beams 18 as depicted in FIG. 13. In addition to providing for the interlocking lateral engagement of the integrated floor planks 70, the ship-lapped lateral edges 34 also provide for a generally smooth transition from one integrated floor plank 70a to a side adjoining integrated floor plank 70b, 70c, etc. The integrated floor planks 70 are preferably attached to the junior beams 18 of the trailer frame 12 using any number of available wood-to-metal floor fasteners 62.

The combination of the ribs 38, the top joiner plate 52, the bottom joiner plate 54 and the threaded fastener 60 serve several purposes, one of which is to add stability to the preferred embodiment improved flooring system 10 to generally prevent the integrated floor plank 70 from warping, twisting, cracking, splitting and otherwise deviating from a generally linear alignment.

It will be appreciated that these and other embodiments may be provided for an improved flatbed trailer flooring system 10, and it should be understood that within the scope of the appended claims, the apparatus might be practiced other than as specifically described herein. Having described the invention above, various modifications of the techniques, procedures and materials will be apparent to those skilled in the art. It is intended that all such variations within the scope and spirit of the appended claims be embraced thereby.

What is claimed is:

1. An improved flooring system for use with flatbed trailers, comprising:
    a plurality of metal reinforced, milled floorboards, wherein said floorboards are affixed to one another in an end-to-end manner to form a single integrated floor plank, such that the linear length of the integrated floor plank is approximately equal to the linear length of the trailer for which the integrated floor plank will be used, each of the milled floorboards having a planed top surface and a bottom surface having a plurality of axial grooves milled therein, wherein each of the milled floorboards further include a plurality of pre-cut, ship-lapped lateral edges such that when the lateral edges of the integrated floor planks engage one another on a frame portion of the flatbed trailer, interlocking contact is created between the lateral edges of the integrated floor planks to provide a smooth and generally uniform cargo surface for the flat bed trailer, and wherein each of the plurality of floorboards further include a pre-cut tenon cut on the top and bottom surfaces at the end portions of the floorboards, where the floorboards are affixed to one another to form the integrated floor plank;
    a plurality of metal reinforcing ribs, wherein a metal rib is inserted into and retained within each of the plurality of grooves in the bottom surface of the milled floorboards, such that an outer edge portion of each metal rib uniformly protrudes outwardly from the bottom surface of the milled floorboard;
    a top joiner plate, wherein said plate is received within the tenon cut end portions of the top surface of the floorboards, said top joiner plate including a plurality of pilot holes and generally providing a smooth transition from a top surface of a first floorboard to a top surface of a second floorboard and a generally smooth surface transition from a lateral edge of a first integrated floor plank to an adjoining lateral edge of a second integrated floor plank;
    a bottom joiner plate, wherein said plate is received within the tenon cut end portions of the bottom surface of the floorboards and is in axial and radial alignment with the top joiner plate, said bottom joiner plate including a plurality of pilot holes and providing a generally smooth surface transition from the lateral edge of the first integrated floor plank to an adjoining lateral edge of a second integrated floor plank; and
    a plurality of threaded fasteners wherein said fasteners threadedly engage and penetrate through the pilot holes of the top joiner plate and further threadedly engage and penetrate the tenon-cut portions of the floorboards and also threadedly engage and penetrate through the pilot holes of the bottom joiner plate to securely attach the linear ends of the floorboards together to form the integrated floor planks.

2. The improved flooring system for use with flatbed trailers, as described in claim 1, wherein the metal reinforcing ribs are comprised of metal bar stock.

3. The improved flooring system for use with flatbed trailers, as described in claim 2, wherein the bottom linear ends of the floorboards are tenon cut after the metal bar stock has been inserted into the plurality of grooves.

4. The improved flooring system for use with flatbed trailers, as described in claim 3, wherein the plurality of threaded fasteners used to secure the top joiner plate and the bottom joiner plate with the floorboards comprise wood-to-metal self-tapping screws.

5. The improved flooring system for use with flatbed trailers, as described in claim 4, wherein the integrated floor planks are perpendicularly positioned on top of a plurality of junior beams comprising a frame portion of the flatbed trailer such that the ship-lapped edges of the integrated floor planks operatively engage and make interlocking contact with one another to provide a generally smooth cargo surface.

6. The improved flooring system for use with flatbed trailers, as described in claim 5, wherein the outer edge portion of each metal rib which uniformly protrudes outwardly from the bottom surface of the linear floorboard makes metal-to-metal contact with the top surface of the junior beams when said integrated floor planks are mounted to said flatbed trailer framing.

7. The improved flooring system for use with flatbed trailers, as described in claim 6, wherein a plurality of wood-to-metal threaded fasteners are used to affix the integrated floor planks to a plurality of junior beams of the flatbed trailer.

8. The improved flooring system for use with flatbed trailers, as described in claim 7, wherein the top joiner plate and the bottom joiner plate are comprised of metallic material.

9. An integrated floor plank, comprising:
a plurality of reinforced, milled floorboards, wherein said floorboards are affixed to one another in an end-to-end manner to form the integrated floor plank, each of said milled floorboard having a planed top surface and a bottom surface having a plurality of axial grooves milled therein, and wherein each of the plurality of floorboards also include pre-cut tenon cuts on the top and bottom surfaces at the end portions of the floorboards;
a plurality of reinforcing ribs, wherein each of said rib is inserted into and retained within each of the plurality of grooves in the bottom surface of the milled floorboards;
a top joiner plate, wherein said plate is received within the tenon cut end portions of the top surface of the milled floorboards;
a bottom joiner plate, wherein said plate is received within the tenon cut end portions of the bottom surface of the milled floorboards; and
a plurality of threaded fasteners wherein said fasteners threadedly engage and penetrate the top joiner plate and further threadedly engage and penetrate the tenon cut portions of the milled floorboards and also threadedly engage and penetrate the bottom joiner plate.

10. The integrated floor plank, as described in claim 9, wherein each of the plurality of milled floorboards further comprises a plurality of pre-cut, ship-lapped lateral edges.

11. The integrated floor plank, as described in claim 10, wherein the reinforcing rib is constructed of metal material and said rib is inserted into and retained within each of the plurality of grooves, such that an outer edge portion of each metal rib uniformly protrudes outwardly from the bottom surface of the milled floorboard.

12. The integrated floor plank, as described in claim 11, wherein the top joiner plate and the bottom joiner plate, each further include a plurality of pilot holes.

13. The integrated floor plank, as described in claim 12, wherein each of the plurality of threaded fasteners penetrate and threadedly engage a pilot hole in the top joiner plate and penetrate and threadedly engage a pilot hole in the bottom joiner plate to securely attach the linear ends of the floorboards together to form the integrated floor plank.

14. The integrated floor, plank, as described in claim 13, wherein the plurality of threaded fasteners used to secure the top joiner plate and the bottom joiner plate with the floorboards comprise wood-to-metal self-tapping screws.

15. The integrated floor plank, as described in claim 14, wherein the integrated floor planks are perpendicularly positioned on top of a plurality of junior beams comprising a frame portion of a flatbed trailer such that the ship-lapped edges of the integrated floor planks operatively engage and make interlocking contact with one another to provide a generally smooth cargo surface for the flatbed trailer.

16. The integrated floor plank, as described in claim 15, wherein the outer edge portion of each rib which uniformly protrudes outwardly from the bottom surface of the linear floorboard makes metal-to-metal contact with the top surface of the junior beams when said integrated floor planks are mounted to said flatbed trailer framing.

17. The integrated floor plank, as described in claim 16, wherein a plurality of wood-to-metal threaded fasteners are used to affix the integrated floor planks to a plurality of junior beams of the flatbed trailer.

18. The integrated floor plank, as described in claim 17, wherein the top joiner plate and the bottom joiner plate are comprised of metallic material.

19. The integrated floor plank, as described in claim 13, wherein the top joiner plate and the bottom joiner plate are comprised of polymer material.

20. A method of making an integrated floor plank comprising the steps of:
planing a stock wooden board to obtain: (1) a desired thickness; (2) a desired width; (3) a desired ship-lapped lateral edge; and (4) a plurality of continuous, axial grooves in a bottom surface of the milled floorboard,
inserting a rib into each of the axial grooves in a bottom surface of the milled floorboard,
milling a tenon cut counter-sunk step into a top end surface and a bottom end surface of both linear ends of the milled floorboard,
inserting a top joiner plate and a bottom joiner plate in the counter-sunk steps,
contacting, in an end-to-end manner, a first milled floorboard with an adjoining second milled floor, and
inserting a threaded fastener into each of a plurality of pilot holes included in the top joiner plate and thereafter threadedly engaging each fastener through the top joiner plate, through the tenon cut ends of the milled floorboards and through a pilot hole in the bottom joiner plate to securely attached the milled floorboards together in an end-to-end manner.

* * * * *